United States Patent
Shin et al.

(10) Patent No.: US 9,407,890 B2
(45) Date of Patent: Aug. 2, 2016

(54) METHOD AND SYSTEM FOR SHARPENING THE LUMA AND THE CHROMA SIGNALS

(75) Inventors: Jaewon Shin, Santa Clara, CA (US);
Brian Schoner, Fremont, CA (US);
Darren Neuman, Palo Alto, CA (US);
David Wu, San Diego, CA (US)

(73) Assignee: BROADCOM CORPORATION, Irvine, CA (US)

( * ) Notice: Subject to any disclaimer, the term of this patent is extended or adjusted under 35 U.S.C. 154(b) by 1617 days.

(21) Appl. No.: 12/353,826

(22) Filed: Jan. 14, 2009

(65) Prior Publication Data
US 2009/0180030 A1 Jul. 16, 2009

Related U.S. Application Data

(60) Provisional application No. 61/020,915, filed on Jan. 14, 2008.

(51) Int. Cl.
*H04N 9/77* (2006.01)
*H04N 9/64* (2006.01)

(52) U.S. Cl.
CPC . *H04N 9/77* (2013.01); *H04N 9/646* (2013.01)

(58) Field of Classification Search
None
See application file for complete search history.

(56) References Cited

U.S. PATENT DOCUMENTS

| | | | | |
|---|---|---|---|---|
| 3,938,181 A | * | 2/1976 | Avins | 348/630 |
| 4,667,304 A | * | 5/1987 | Hier et al. | 708/819 |
| 5,335,069 A | * | 8/1994 | Kim | 348/630 |
| 6,600,517 B1 | * | 7/2003 | He et al. | 348/625 |
| 6,731,823 B1 | * | 5/2004 | Gallagher et al. | 382/266 |
| 6,891,977 B2 | * | 5/2005 | Gallagher | 382/263 |
| 2005/0169522 A1 | * | 8/2005 | Schoner | 382/167 |

* cited by examiner

*Primary Examiner* — Michael Teitelbaum
(74) *Attorney, Agent, or Firm* — Foley & Lardner LLP; Joseph N. Ziebert; Helen H. Zhang

(57) ABSTRACT

A video processing system may be operable to utilize multi-band sharpening to process luma signals for image signals. The luma signal may be decomposed into a plurality of frequency band components, wherein each component may be processed separately using different sharpening gains and/or offsets. The multi-band processed components may be combined to generate sharpened output luma signals. The multi-band sharpening may be performed utilizing peaking processing, and the input luma signal and/or LTI sharpened luma signals may be combined with the multi-band peaking sharpened signals to generate the sharpened output luma signals. Corresponding chroma signals may also be adjusted to generate sharpened output chroma signals. Luma and/or chroma sharpening operations may be further adjusted based on coring, clipping avoidance, luma statistics, color region detections, and/or curve control parameters. Sharpened output image signals may be generated based on the sharpened output luma signals and the sharpened output chroma signals.

25 Claims, 7 Drawing Sheets

METHOD AND SYSTEM FOR SHARPENING THE LUMA AND THE CHROMA SIGNALS

CROSS-REFERENCE TO RELATED APPLICATIONS/INCORPORATION BY REFERENCE

This patent application makes reference to, claims priority to and claims benefit from U.S. Provisional Application Ser. No. 61/020915 filed on Jan. 14, 2008.

The above stated application is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to video processing. More specifically, certain embodiments of the invention relate to a method and system for sharpening luma and the chroma signals.

BACKGROUND OF THE INVENTION

In video systems, an image is projected in a display terminal such as televisions and/or PC monitors. Most video broadcasts, nowadays, utilize video processing applications that enable broadcasting video images in the form of bit streams that comprise information regarding characteristics of the image to be displayed including brightness (luma) and color (chroma). These video applications may utilize one or more of available encoding scheme including Y'CbCr, wherein the chroma data in each video pixel may be represented via the Cb-Cr value.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for sharpening luma and the chroma signals, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for sharpening luma and the chroma signals. In various embodiments of the invention, a video processing system may be operable to utilize multi-band sharpening to process luma signals for image signals. The video processing system may enable decomposing the luma signals into a plurality of frequency band components, wherein each component may be processed separately using different sharpening gains and/or offsets. The video processing system may be operable to generate the frequency band components based on beam direction and/or frequency level. The plurality of frequency band components may comprise vertical, horizontal and/or diagonal, and/or low, medium and/or high frequency components. The video processing system may be operable to combine the multi-band processed components to generate multi-band sharpened luma signals. The multi-band sharpening may be performed utilizing peaking processing.

The video processing system may be operable to combine the multi-band peaking output signal with the input luma signals and/or output signals of luma transient improvement (LTI) sharpening processing of the input luma signals to generate sharpened output luma signals. The video processing system may be operable to adjust corresponding chroma signals for the image signals to generate sharpened output chroma signals. Chroma transient improvement (CTI) processing may be utilized to sharpen the input chroma signals. The video processing system may be operable to further adjust luma and/or chroma sharpening operations based on input and/or output coring, clipping avoidance, luma statistics, color region detection and/or curve control parameters and/or operations. The video processing system may be operable to generate sharpened output image signals based on the sharpened output luma signals and the sharpened output chroma signals.

Figure 1A:
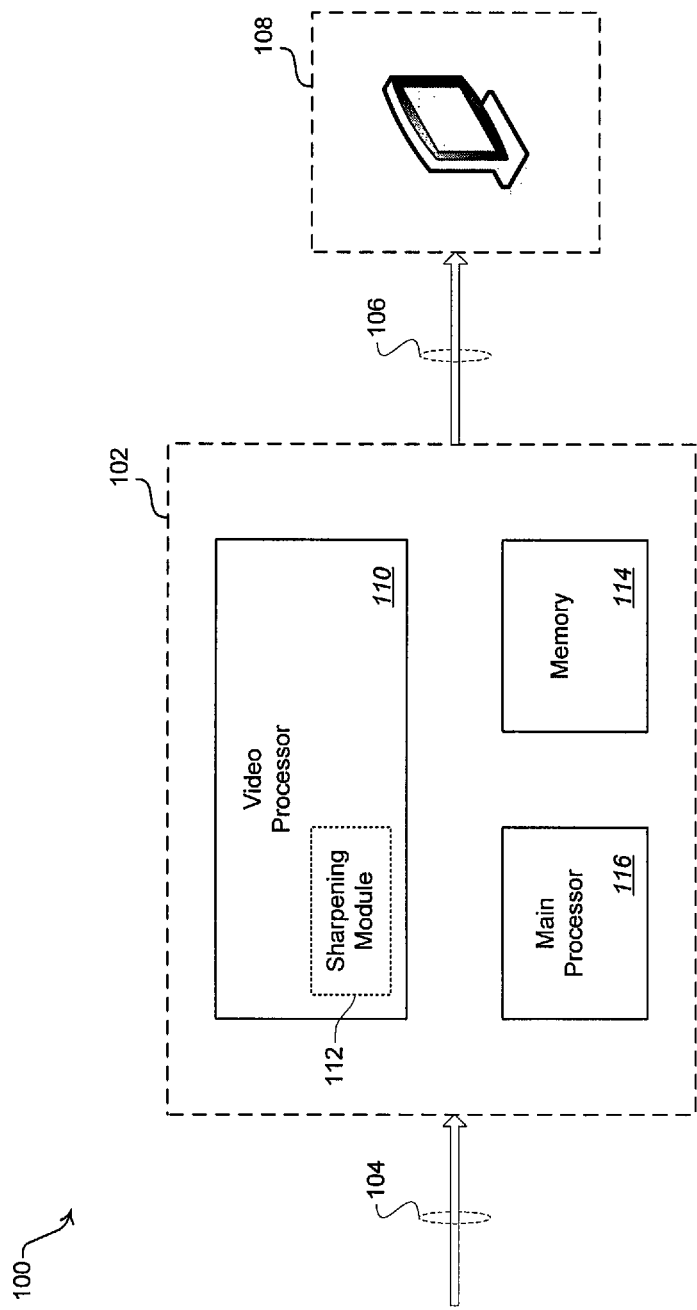
FIG. 1A is a block diagram that illustrates an exemplary video system that comprises a sharpening module that is operable to sharpen luma and chroma signals, in accordance with an embodiment of the invention.

FIG. 1A is a block diagram that illustrates an exemplary video system that comprises a sharpening module that is operable to sharpen luma and chroma signals, in accordance with an embodiment of the invention. Referring to FIG. 1A, there is shown a video system 100 comprising a processing subsystem 102, an input video stream 104, an output video stream 106, a display subsystem 108, a video processor 110, a sharpening module 112, a memory 114, and a main processor 116.

The processing subsystem 102 may comprise the video processor 110, the sharpening module 112, the memory 114, the main processor 116, and suitable logic, circuitry, interfaces and/or code that may enable processing of video streams and/or to generate video playback streams.

The video processor 110 may comprise suitable logic, circuitry, interfaces and/or code that may be operable to perform video processing operations, comprising, for example image sharpening operations, which may be performed via the sharpening module 112. The video processor 110 may be operable to process the input video stream 104, received via the video system 100, to enable generating the output video stream 106 for display via the display subsystem 108. The sharpening module 112 may comprise suitable logic, circuitry, interfaces and/or code that may enable performing image sharpening operations.

The main processor 116 may comprise suitable logic, circuitry, interfaces and/or code that enable performing main control and/or management operations in the processing subsystem 102. The main processor 116 is utilized to control at least a portion of the memory 114, the video processor 110, and/or the sharpening module 112. In this regard, the main processor 116 may generate, for example, at least one or more signals for controlling operations within the processing subsystem 102. The main processor 116 may also enable execution of applications that may be utilized by the processing subsystem 102.

The memory 114 may comprise suitable logic, circuitry, interfaces and/or code that may enable storage and/or retrieval of data, code and/or instructions in the processing subsystem 102. The memory 114 may be operable, for example, to queue data and/or storage of code and/or configuration data utilized during video processing operations via the processing subsystem 102.

The display subsystem 108 may comprise suitable logic, circuitry and/or code that may enable performing display operations based on the output video stream 106, generated via the processing subsystem 110. The display subsystem 108 and the processing subsystem 110 may be integrated within a single device, for example within a television. Alternatively, the display subsystem 108 and the processing subsystem 110 may be integrated in different devices that may then be coupled to enable playback operations. For example, the display subsystem 108 may correspond to display logic in a television whilst the processing subsystem 110 may be integrated within a set-top box that may be utilized to perform dedicated video processing operations.

The input video stream 104 may comprise a data stream comprising video information. The input video stream 104 may comprise, for example, an encoded video stream which may be generated and/or communicated, for example, via television head-ends and/or audio/video playback devices. The output video stream 106 may comprise a stream of video data is that suitable for display operations via display logic, for example in the display subsystem 108.

In operation, the video system 100 may be operable to perform video display and/or playback operations, to facilitate, for example, displaying of images corresponding to video data received via the input video stream 104. The processing subsystem 102 may be operable to perform video processing operations, via the video processor 110, which may enable, for example, generation of the output video stream 106. The generated output video stream 106 may be utilized to facilitate video display and/or playback operations via the display subsystem 108. The video processor 110 may be operable, for example, to generate the luma and chroma signals pertaining to images that may correspond to video data received via the input video stream 104. Luma signals may represent the brightness information while the chroma signals may represent the color information. For the Y'CbCr color space, the Cr and Cb parameters may correspond to color or chroma component of images and the Y' parameter may represent the brightness or luma component of the images. In the Y'CbCr color space, color may be represented as brightness and two color difference signals. Each image may be represented by a plurality of Y'CbCr encoded video pixels, each of which may be represented as a triplet (Y', Cr, Cb).

In general, when performing sharpening, images may be susceptible to the introduction of artifacts, which may result in degradation of the resulting generated images. For example, sharpening may amplify noise that may have been introduced into the luma and/or chroma signal during communication or other processing of the video streams. Sharpening operations may also introduce and/or amplify artifacts such as jaggedness and/or aliasing effects, which may be caused by undesired high frequency components during signal processing of luma and/or chroma signal.

In accordance with various embodiments of the invention, the video system 100 may be operable to improve and/or enhance the quality of the images displayed by the display subsystem 108. In this regard, the video processor 110 may be operable to sharpen the images without the introduction of artifacts or the degradation of the image. For example, the sharpening module 112 may be operable to sharpen the images to improve the sharpness (or contrast) of the displayed images without causing jaggedness or aliasing.

In an exemplary embodiment of the invention, the sharpening module 112 may be operable to utilize multi-band sharpening to process the images. During multi-band sharpening, a luma signal may be decomposed into its frequency band components. Each of the frequency band components may then be processed independently to ensure that the sharpening processing for each frequency band component may be specifically configured, managed, controlled, and/or adjusted to address, for example, sharpening requirements, limitations and/or artifacts that are particular to that frequency band component. Additionally, other techniques may also be utilized during sharpening operations to ensure high quality of sharpened images, and/or to guard against and/or mitigate potential artifacts that may be encountered during sharpening operations. For example, coring maybe utilized, via the sharpening module 112 for example, during sharpening operations. During coring, certain low-amplitude high-frequency components of a signal may be suppressed to mitigate noise since the high-frequency components may likely constitute noise. Clipping avoidance may also be utilized, via the sharpening module 112 for example, to further ensure image quality. Clipping avoidance may be utilized to limit, control and/or adjust sharpening operations near the brightness limits of a system, for example near brightness values corresponding to black and/or white areas.

Figure 1B:
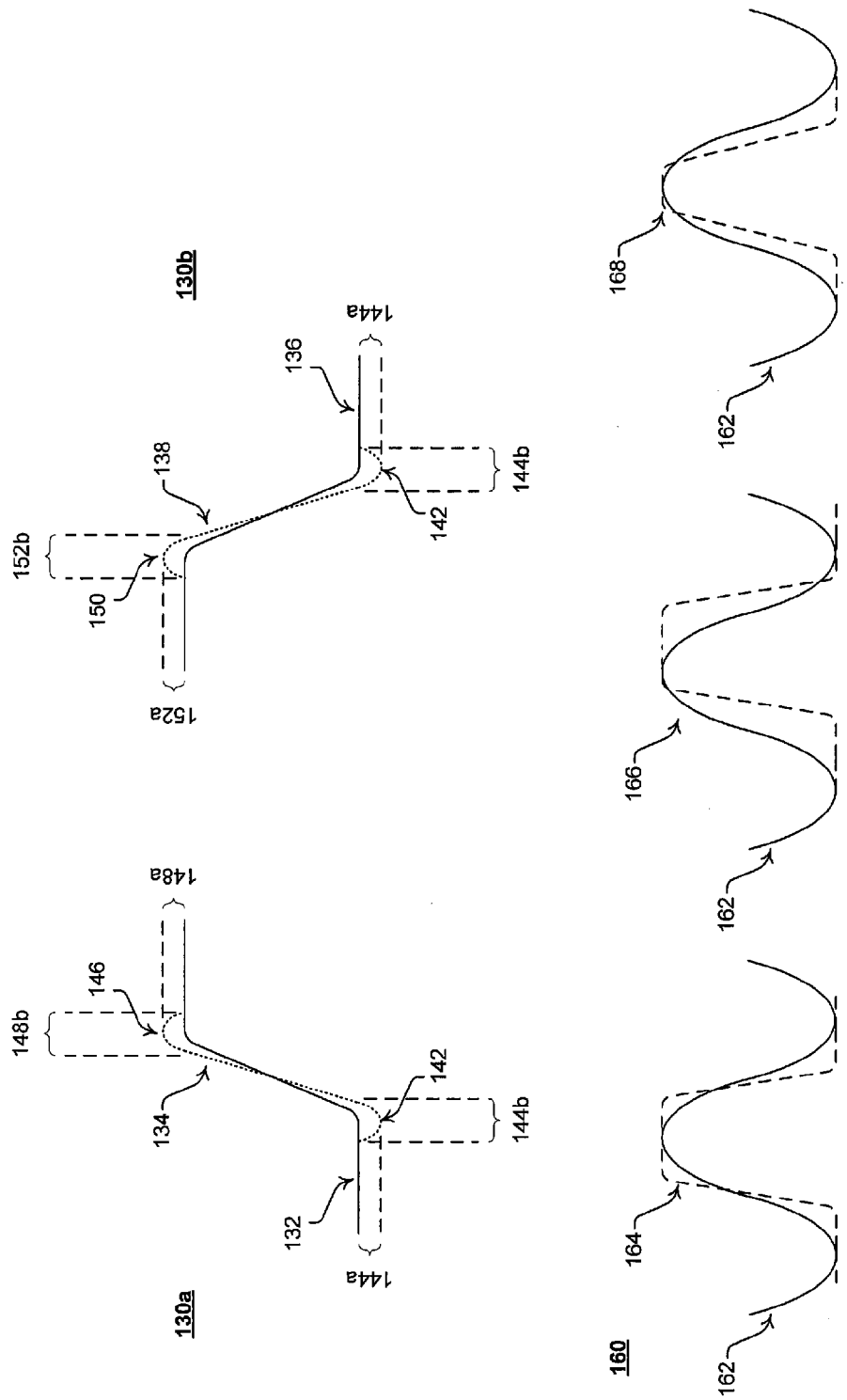
FIG. 1B is a diagram that illustrates use of peaking and/or transient improvement to adjust signal edge sloping, in accordance with an embodiment of the invention.

FIG. 1B is a diagram that illustrates use of peaking and/or transient improvement to adjust signal edge sloping, in accordance with an embodiment of the invention. Referring to FIG. 1 B, there is shown a signal rising edge peaking adjustment 130a, a signal falling edge peaking adjustment 130b, and signal transient improvement 160.

Peaking is a linear signal processing operation that may enable amplifying some (usually high) frequency components of an input signal. Peaking may be implemented by utilizing a high-pass filter, for example, to extract high frequency component of the input signal, multiplying the extracted component by some gain and then adding it back to the input signal. During signal rising edge peaking adjustment 130a on an input signal 132, peaking processing adds an undershoot 142 and/or an overshoot 146 to generated new peaked signal 134. The gain and/or filtering parameters which may be used during the peaking operations may determine gain of undershoot 144a, width of undershoot 144b, gain of overshoot 148a, and/or width of overshoot 148b. During signal falling edge peaking adjustment 130b on an input signal 136, peaking processing may add undershoot 142 and/or a preshoot 150 to generated new peaked signal 138. The gain and/or filtering parameters which may be used during the peaking operations may determine gain of undershoot 144a, width of undershoot 144a, gain of preshoot 152a, and/or width of preshoot 152b. Different gain parameters may be utilized to enable generating, for example, different undershoots, preshoots and/or overshoots.

Transient improvement is a signal processing operation that may enable an increase in the edge rate and/or edge slopes of an input signal. Transient improvement is a non-linear operation and may be performing by performing a peaking operation followed by clamping operation that may enable removing undershoots, overshoots, and/or preshoots. Various parameters may be relevant to the characteristics of transient improvement and/or generated signals. For example, gain and/or phase shift parameters used during transient improvement operations may determine the direction and/or degree of edge slope change performed. For example, during transient improvement 160 on an input signal 132, the transient improvement may be performed with only gain to generated output signal 164. Alternatively, a uniform phase shift may also be used during the transient improvement processing to generate signal 166. A gain and/or a phase shift whose direction depends on edge polarity of the input signal 162 may be utilized to generate output signal 168.

In operation, peaking adjustments and/or transient improvement may be utilized via the sharpening module 112, for example, to sharpen images during video processing. Both peaking and transient improvement techniques may enable generation of output luma and/or chroma signals with steeper edge slopes, which may give a perception of more contrast and/or sharpness around edges in corresponding generated images which may displayed via the display subsystem 108. For example, peaking operations may be utilized, by the sharpening module 112, for example, to improve sharpness quality corresponding to luma signals processed via the video processor 110, and to improve brightness related contrast in images displayed via the display subsystem 108. Luma transient improvement (LTI) based operations may also be utilized, via the sharpening module 112 to perform luma sharpening operations. During LTI processing, transient improvement adjustments, which may be tailored to suit characteristics of luma signals, may be performed on luma signals. For example, since luma signals are utilized to generate 2-dimensional (2-D) images, transient improvement adjustments may be performed such that both vertical and horizontal frequency components of luma signals are processed. Additionally, since luma signals are utilized to generate brightness impressions, the LTI adjustments may be controlled such that the changes may not cause undesired brightness and/or contrast effects.

Chroma transient improvement (CTI) based operations may be utilized, via the sharpening module 112 for example, to improve sharpness quality corresponding to chroma signals processed via the video processor 110, to improve color related contrast in images displayed via the display subsystem 108. During CTI processing, transient improvement adjustments, which may be tailored to suit characteristics of chroma signals, may be performed on chroma signals. For example, since chroma signals are utilized to generate 2-dimensional (2-D) images, transient improvement adjustments may be performed such that both vertical and horizontal frequency components of chroma signals are processed. Additionally, since chroma signals are utilized to generate coloring impressions, the CTI adjustments may be controlled such that the changes may not cause undesired coloring effects.

In an exemplary embodiment of the invention, multi-band peaking may be utilized during luma sharpening operations. Luma signal processed via the sharpening module 112 may be decomposed, for example, into a plurality of frequency band components. Generation of the plurality of frequency band components may be done, for example, based on a plurality of factors which may comprise directional and/or frequency criteria. For example, a luma signal processed via the sharpening module 112 may be decomposed into plurality of frequency band components based on a determination of horizontal, diagonal, and/or vertical frequency beam directions, and/or based on a determination of whether frequency beams comprise low, medium and/or high frequencies. Peaking based sharpening operations may then be performed on each of frequency band components independently. During processing of each frequency band component, different peaking parameters may be used to facilitate generating signals with varying gain of overshoot 144a, width of undershoot 144b, gain of overshoot 148a, width of overshoot 148b, gain of preshoot 152a, and/or width of preshoot 152b, to optimize image sharpening quality while minimizing and/or eliminating potential artifacts that may cause degradation and/or distortion of the overall image. The peaking parameters utilized during multi-band peaking processing operations may be determined based on predetermined and/or pre-programmed configuration data, user input, and/or based on dynamically determined data.

Figure 2A:
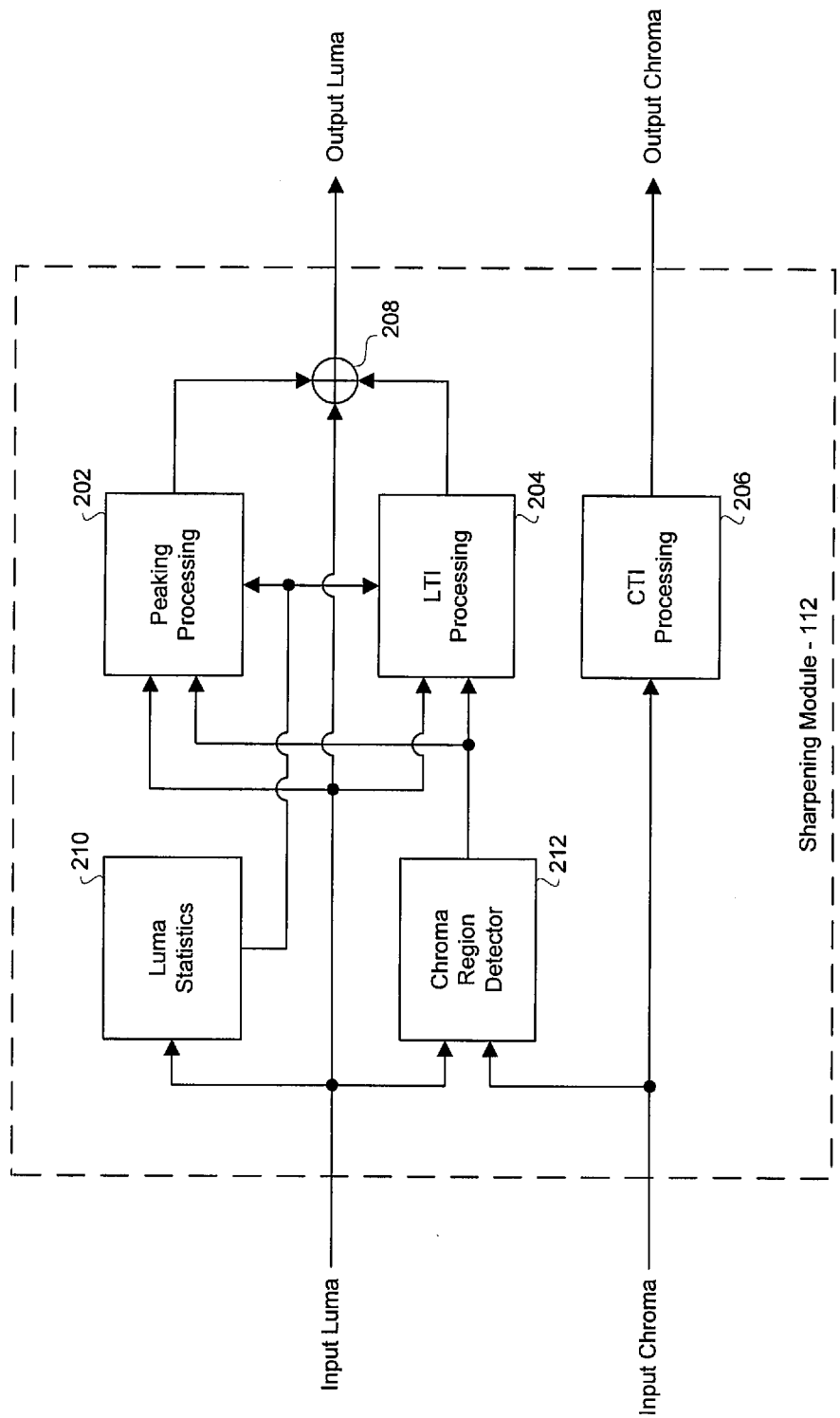
FIG. 2A is a block diagram that illustrates an exemplary sharpening module that is operable to perform multi-band based sharpening processing, in accordance with an embodiment of the invention.

FIG. 2A is a block diagram that illustrates an exemplary sharpening module that is operable to perform multi-band based sharpening processing, in accordance with an embodiment of the invention. Referring to FIG. 2A, there is shown the sharpening module 112, a peaking processing function 202, a luma transient improvement (LTI) processing function 204, a chroma transient improvement (CTI) processing function 206, a combiner 208, a luma statistics function 210, and a chroma region detector 212.

The peaking processing function 202 may comprise suitable logic, circuitry, interfaces and/or code that may enable performing peaking based sharpening processing operations on input luma signals. The peaking processing function 202 may be operable to utilize multi-band peaking processing during luma sharpening processing operations.

The LTI processing function 204 may comprise suitable logic, circuitry, interfaces and/or code that may enable performing transient improvement based sharpening processing operations on input luma signals.

The CTI processing function 206 may comprise suitable logic, circuitry, interfaces and/or code that may enable performing transient improvement based sharpening processing operations on chroma signals.

The combiner 208 may comprise suitable logic, circuitry, interfaces and/or code that may enable combining a plurality of input signals to generate an output signal, wherein said combining may comprise adding, subtracting, and/or necessary scaling adjustment.

The luma statistics function 210 may comprise suitable logic, circuitry, interfaces and/or code that may enable generating, maintaining and/or managing luma statistic related information for regions of neighboring pixels in an image during processing luma signals. The luma statistics function 210 may be operable, for example, to provide sharpening adjustment inputs and/or limitations during luma processing operations based on neighboring pixels' luma data to guard against introducing, for example, potential artifacts such as aliasing.

The chroma region detector 212 may comprise suitable logic, circuitry and/or code that may enable determining color regions based on input luma and/or chroma signals. The chroma region detector 212 may be operable to determine whether a region of an image, for example, corresponds to flesh, sky and/or grass. Accordingly, the sharpening operations, both for luma and chroma signals, maybe then controlled and/or adjusted based on the determined color region where such color region impose specific sharpening requirements and/or limits. The chroma region detector 212 may also comprise, for example, a median filtering function that enable removing noise components in chroma and/or luma parameters. For example, the chroma region detector 212 may comprise a plurality of two-dimensional (2D) median filters that may be operable to enable removing noise from Y, Cb, and/or Cr components during region detection operations.

In operation, the sharpening module 112 may be operable, via the video processor 110 in the video system 100, to perform sharpening operations during processing of luma and chroma signals. The input luma signal may be inputted into the peaking processing function 202, which may perform peaking based processing operations, substantially as described with regards to, for example, FIG. 1A and 1B. The input luma signal may also be inputted into the LTI processing function 204, which may perform luma transient improvement (LTI) based processing operations. The original input luma signal may then be combined with the outputs from the peaking processing function 202 and the LTI processing function 204 via the combiner 208 to generate a sharpened output luma signal. The input chroma signal may be inputted into the CTI processing function 206, which may perform chroma transient improvement (CTI) based processing operations, substantially as described with regards to, for example, FIG. 1A and 1B. The CTI processing function 206 may then generates a sharpened output chroma signal. The generated sharpened luma and chroma signal may then be utilized to enable producing sharpened images via the display subsystem 108, for example, in the video system 100.

The sharpening processing operations performed via the peaking processing function 202, the LTI processing function 204 and/or the CTI processing function 206 may be configured, controlled, managed and/or adjusted based on predetermined data, user input, and/or based on dynamically determined data during the processing operations. For example, the input luma signal may be fed into the luma statistics function 210 during sharpening operations in the sharpening module 112 to enable generating and/or maintaining luma information for neighboring pixels' regions, which may be utilized to control and/or adjust luma sharpening operations via the peaking processing function 202 and/or the LTI processing function 204. The input luma and chroma signals may be inputted into the color region detector 212 to enable determining relevant color regions in images corresponding to the input luma and chroma signals. The color region determination may then be utilized to control and/or adjust luma and/or chroma sharpening operations via the peaking processing function 202, the LTI processing function 204, and/or the CTI processing by applying different sharpening parameters. For example, where a region is determined to correspond to a facial color area, sharpening parameters that ensure less contrast may be utilized.

In an exemplary aspect of the invention, multi-band peaking may be utilized via the peaking processing 202 during luma sharpening operations. Luma signal, corresponding to an image, processed via the peaking processing 202 may be decomposed, for example, into a plurality two-dimensional (2D) sub-frequency band components, wherein the plurality of frequency band components may be based on horizontal, vertical and/or diagonal frequency beam direction and/or based on determination of whether frequency beams comprise low, medium and/or high frequencies. The frequency band components may be extracted via series of horizontal and/or vertical high-pass filters (HPF) and/or band-pass filters (BPF). For example, each frequency band component may be characterized as:

$$C_{ij}(x, y) = BPF_{hor,i}(BPF_{ver,j}(in(x,y)))$$

where $C_{ij}(x, y)$ may be an output of $i^{th}$ horizontal BPF and $j^{th}$ vertical BPF within the peaking processing function 202 and in(x,y) may comprise the original input luma signal. Each of frequency band components may be multiplied by different gain and/or may be adjusted independently based on input, control and/or configuration data, for example input from the luma statistics function 210. The components may then be combined to generate the output of the peaking processing function 202, which may then be combined with the input luma signal and/or the output of the LTI processing function 204 via the combiner 208. The peaking parameters that are utilized during multi-band peaking processing operations in the peaking processing function 202 may be determined based on predetermined and/or preprogrammed configuration data, user input, and/or based on dynamically determined data.

Figure 2B:
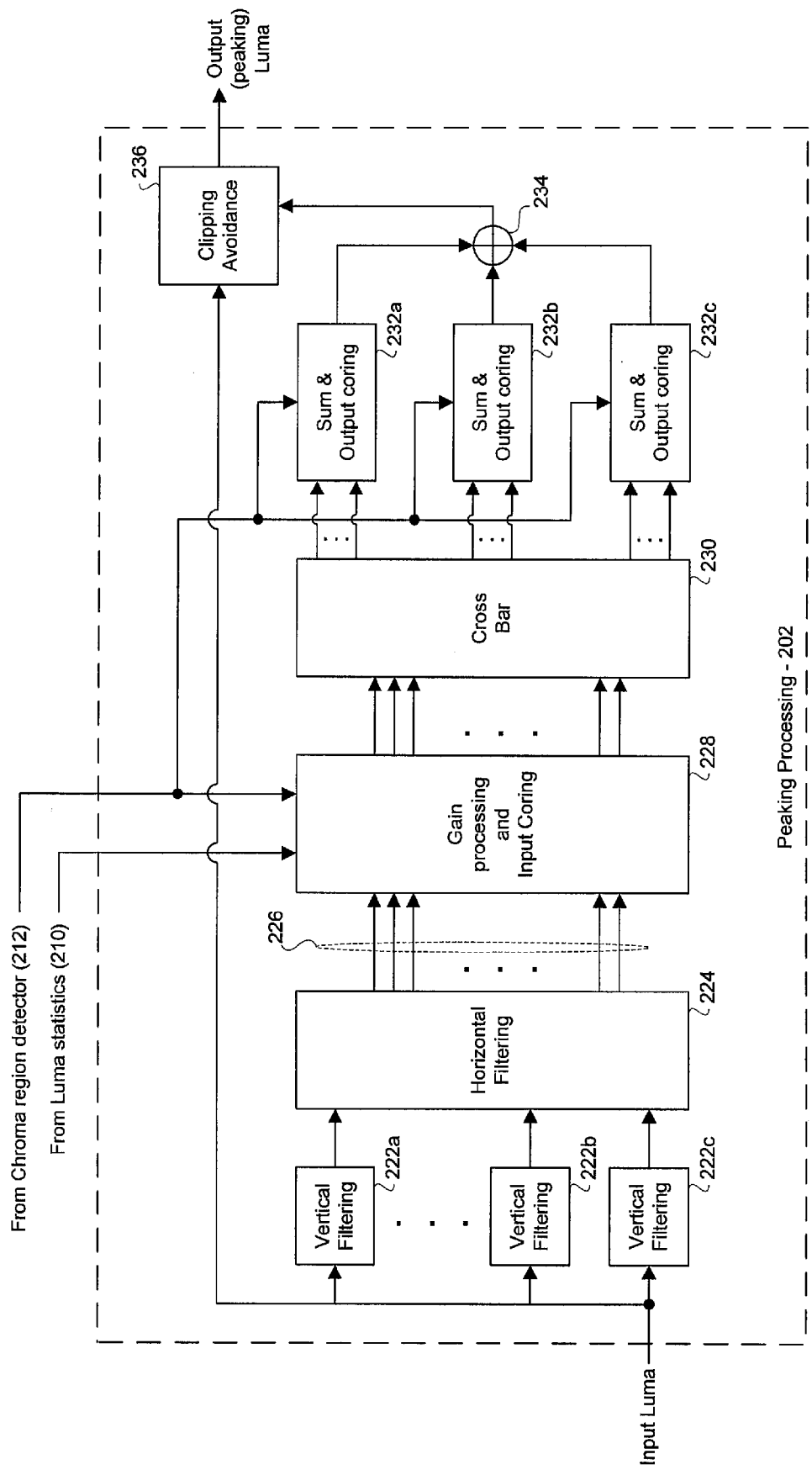
FIG. 2B is a block diagram that illustrates an exemplary peaking processing function that is operable to perform multi-band based peaking processing during luma sharpening operations, in accordance with an embodiment of the invention.

FIG. 2B is a block diagram that illustrates an exemplary peaking processing function that is operable to perform multi-band based peaking processing during luma sharpening operations, in accordance with an embodiment of the invention. Referring to FIG. 2B, there is shown a plurality of vertical filtering functions 222a, ..., 222c, a horizontal filtering function 224, a gain processing and input coring function 228, a cross bar function 230, a plurality of sum processing and output coring function 232a, ... 232c, a combiner 234, and a clipping avoidance function 236.

Each of the vertical filtering functions 222a, ..., 222c may comprise suitable logic, circuitry and/or code that may enable performing vertical signal filtering operations. The plurality of vertical filtering functions 222a, ..., 222c may comprise, for example, a set of vertical band-pass filters (BPF). The horizontal filtering function 224 may comprise suitable logic, circuitry and/or code that may be operable to perform horizontal signal filtering operations. The horizontal filtering function 224 may comprise, for example, a set of horizontal band-pass filters (BPF). Filtering parameters, for example coefficients and/or taps, of the vertical and/or horizontal filters utilized in the plurality of vertical filtering functions 222a, ..., 222c and/or the horizontal filtering function 224 may be predetermined and/or preprogrammed to enable decomposing luma signal to generate a corresponding plurality of frequency band components 226, substantially as described with regards to FIG. 2A.

The gain processing and input coring function 228 may comprise suitable logic, circuitry and/or code that may be operable to perform gain processing and/or coring adjustments to the plurality of frequency band components 226.

The gain parameters applicable to each of the plurality of frequency band components 226 may be different, and may be predetermined, user specified, and/or dynamically determined and/or modified during processing operations.

The cross bar function 230 may comprise suitable logic, circuitry, interfaces and/or code that may enable grouping the processed plurality of frequency band components 226 into subsets based on one or more criteria to facilitate further peaking related adjustments. For example, the cross bar function 230 may be operable to group and route the plurality of frequency band components 226 into vertical, horizontal and diagonal or low, medium and high frequency groupings. Each of the plurality of sum processing and output coring function 232a, . . . , 232c may comprise suitable logic, circuitry, interfaces and/or code that may enable combining the components within the groups generated via the cross bar function 230, to enable performing differing output coring adjustments, for example.

The combiner 234 may be similar to the combiner 208, substantially as described with regards to FIG. 2A. The clipping avoidance function 236 may comprise suitable logic, circuitry, interfaces and/or code that may be operable to perform clipping avoidance adjustments. The clipping avoidance function 236 may be operable, for example, to guard against and/or to prevent sharpening adjustments that may cause the luma signals to exceed brightness limits of in the system 100.

In operation, the peaking processing function 202 may be operable to perform multi-band peaking based sharpening processing of luma signals. The plurality of vertical filtering functions 222a, . . . , 222c and the horizontal filtering function 224 may be operable to enable decomposing the input luma signal into the plurality of frequency band components 226, substantially as described with regards to FIG. 2A. Each of the plurality of frequency band components 226 may then be processed independently via the gain processing and input coring function 228. During processing of each of the plurality of frequency band components 226, different gain parameters may be utilized. Initial gain parameters may be predetermined and/or preprogrammed, and/or may be selected based on determination of user image sharpness input. Additionally, during processing of each of the plurality of frequency band components 226 gain modifications and/or adjustments may be performed. The gain adjustments may be performed, for example, utilizing a plurality of gain offsets that may be applied at different frequencies. Gain processing may also be adjusted based on input data from other components, for example input from luma statistics function 210 and/or color region detector 212. Gain parameters may be further modulated and/or adjusted according to the local signal coring criteria, for example local amplitude of input signals, to core out components of input signals that are likely to be noise. Input coring adjustments may be applied uniformly to the plurality of frequency band components 226. Alternatively, different input coring parameters may be used for each and/or for subsets of the plurality of frequency band components 226.

The gain processed components may then be inputted into cross bar function 230, wherein the processed component may be grouped and/or routed based on one or more grouping criteria. Exemplary grouping criteria may comprise beam direction and/or frequency level. For example, the gain processed components may be grouped into 3 groups based on vertical, horizontal and/or diagonal beam direction. The groups of gain processed components may then be processed via the plurality of sum processing and output coring function 232a, . . . , 232c. In this regard, the components within each group may be combined and corresponding output coring parameters and/or requirements may be utilized to adjust and/or modify the signals to core out components of the output signals that are likely to be noise. The outputs of the plurality of sum processing and output coring function 232a, . . . , 232c may then be combined via the combiner 234, and the resultant signal may then be processed via the clipping avoidance function 236. The clipping avoidance function 236 may be operable to attenuate the output signal to prevent sharpening adjustment that may improperly adjust the output signal outside applicable brightness range in the system.

Figure 2C:
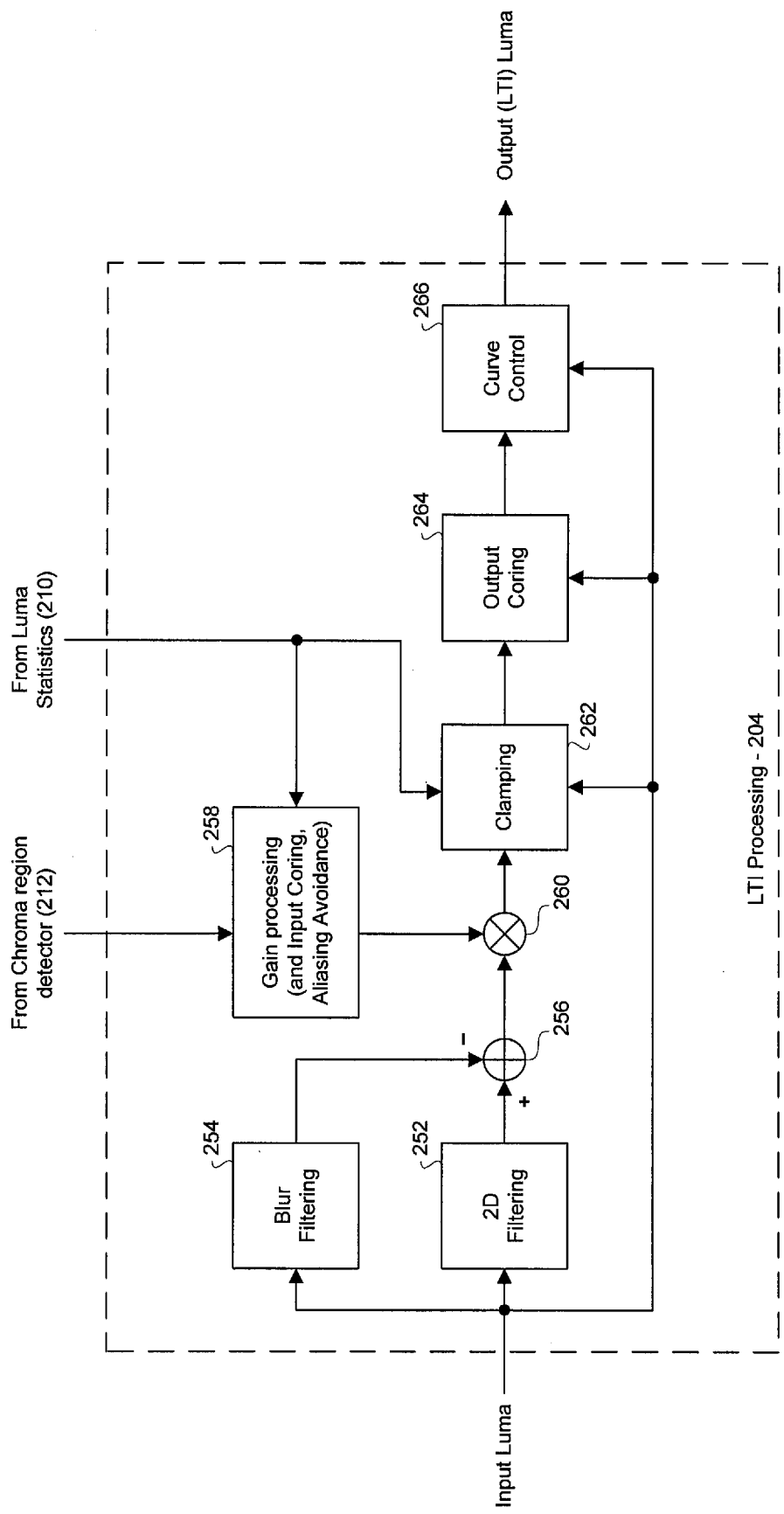
FIG. 2C is a block diagram that illustrates an exemplary LTI processing function that is operable to perform 2D LTI processing during luma sharpening operations, in accordance with an embodiment of the invention.

FIG. 2C is a block diagram that illustrates an exemplary LTI processing function that is operable to perform 2D LTI processing during luma sharpening operations, in accordance with an embodiment of the invention. Referring to FIG. 2C, there is shown a two-dimensional (2D) filtering function 252, a blur filtering function 254, a combiner 256, a gain processing function 258, a multiplier 260, a clamping function 262, an output coring function 264, and curve control function 266.

The 2D filtering function 252 may comprise suitable logic, circuitry, interfaces and/or code that may be operable to perform vertical and horizontal signal filtering. The 2D filtering function 252 may comprise one or more vertical filters and one or more horizontal filters which are operable to filter out low frequencies, for example, to enable performing peaking of input signals. Filtering parameters, for example coefficients and/or taps, of filters utilized in the 2D filtering function 252 may be predetermined, dynamically programmed and/or preprogrammed.

The blur filtering function 254 may comprise suitable logic, circuitry, interfaces and/or code that may enable filtering out frequencies that may otherwise be processed via the LTI processing function 204, and/or which may pass through the 2D filtering function 252. For example, in instances where LPF filters are utilized via the 2D processing function 252, the blue filtering function 254 may comprise a LPF filter with higher cut-off frequency.

The combiner 256 may be similar to the combiner 208, substantially as described with regards to FIG. 2A. The gain processing function 258 may comprise suitable logic, circuitry, interfaces and/or code that may enable generating and/or adjusting gain that is used during signal processing operation via the LTI processing function 204. The gain processing function 258 may be operable to use a predetermined LTI gain, which may be adjusted based on a plurality of input and/or data, including, for example, input from the luma statistics function 210, input from the color region detector 212, input luma signal coring input and/or data, and/or aliasing avoidance input and/or data. The multiplier 260 may comprise suitable logic, circuitry, interfaces and/or code that may enable multiplying an input signal and input gain to generate an output signal.

The clamping function 262 may comprise suitable logic, circuitry, interfaces and/or code that may enable processing a signal to remove frequency components that may be above and/or below maximum and/or minimum values, thereby removing, for example, any undershoots, overshoots and/or preshoots. The clamping thresholds may be determined based on a predetermined value and/or based on input, for example, from the luma statistics function 210.

The output coring function 264 may comprise suitable logic, circuitry, interfaces and/or code that may enable processing signals based on output signal coring requirements and/or limitations. The curve control function 266 may comprise suitable logic, circuitry, interfaces and/or code that may enable to process signals to perform any phase shifting adjustments during transient improvement operations, substantially as described with regards to FIG. 1B. The coring and/or curve control adjustments may be performed based on predetermined and/or dynamically generated input and/or data.

In operation, the LTI processing function 204 may be operable to perform luma transient improvement based sharpening processing of luma signals. The input luma signal may be inputted to the 2D filtering function 252 to enable to filtering out low frequency vertical and horizontal components of the input luma signal. The output of the blur filtering function 254 may then be subtracted from the output of the 2D filtering function 252 via the combiner 256. Subtracting the output of the blur filtering function 284 may limit sharpening adjustments to only the medium to med-high frequency components of the input luma signal, by filtering out the very high frequency components of the input luma signal, to reduce, for example, risk of introducing aliasing. Various thresholds may be specified to indicate varying levels of frequency components such as, for example, high frequency components. The multiplier 260 may then be operable to apply LTI gain, inputted from the gain processing function 258, to the filtered signal to facilitate sharpening adjustments.

Initial LTI gain parameters may be predetermined and/or preprogrammed, and/or may be selected based on determination of user image sharpness input. Additionally gain adjustments and/or modifications may be performed via the gain processing function 258. Gain adjustments may be performed, for example, utilizing a plurality of gain values and/or offsets that may enable applying different gains at different frequencies, via piecewise linear functions for example. Gain processing may also be adjusted based on input data from other components, for example input data from luma statistics function 210 and/or color region detector 212. Gain parameters may be further modulated and/or adjusted according to the local signal coring criteria, for example local amplitude of input signals, to core out components of input signals that are likely to be noise. The gain processing function 258 may also be operable to adjust the LTI gain to prevent and/or to guard against potential aliasing.

The gain processed signal may be inputted into the clamping function 262, wherein clamping adjustments may be performed based on the original input luma signal. The clamping function 262 may enable smoothing the edges by removing, for example, any overshoots, undershoots and/or preshoots. The clamping function 262 may utilize, for example, the input luma signal to determine clamping parameters. The clamped signal may then be inputted into output coring function 264 to perform applicable adjustments based on output coring parameters and/or requirements, to core out components of the output signals that are likely to be noise, for example.

The cored signal may then be inputted into curve control function 266 to enable performing curve control processing adjustments. The curve control function 266 may be operable, for example, to perform phase shifting adjustments, substantially as described with regards to FIG. 1 B, to ensure that the edge slopes of the processed signal may fall within the edge slopes of the original input luma signal, substantially similar to output signal 168, as described with regards to FIG. 1B. The sharpened luma signal may then be outputted.

In an exemplary aspect of the invention, the kickoff point to initiate luma sharpening via the LTI processing function 202 may be adjustable by utilizing, for example, variable and/or controllable frequencies thresholds via the 2D filtering function 254. For example, low-pass filters (LPF) with adjustable cutoff frequencies may be utilized in the 2D filtering function 254 to enable adjustment of the frequency threshold for initiating LTI processing of luma signals.

Figure 2D:
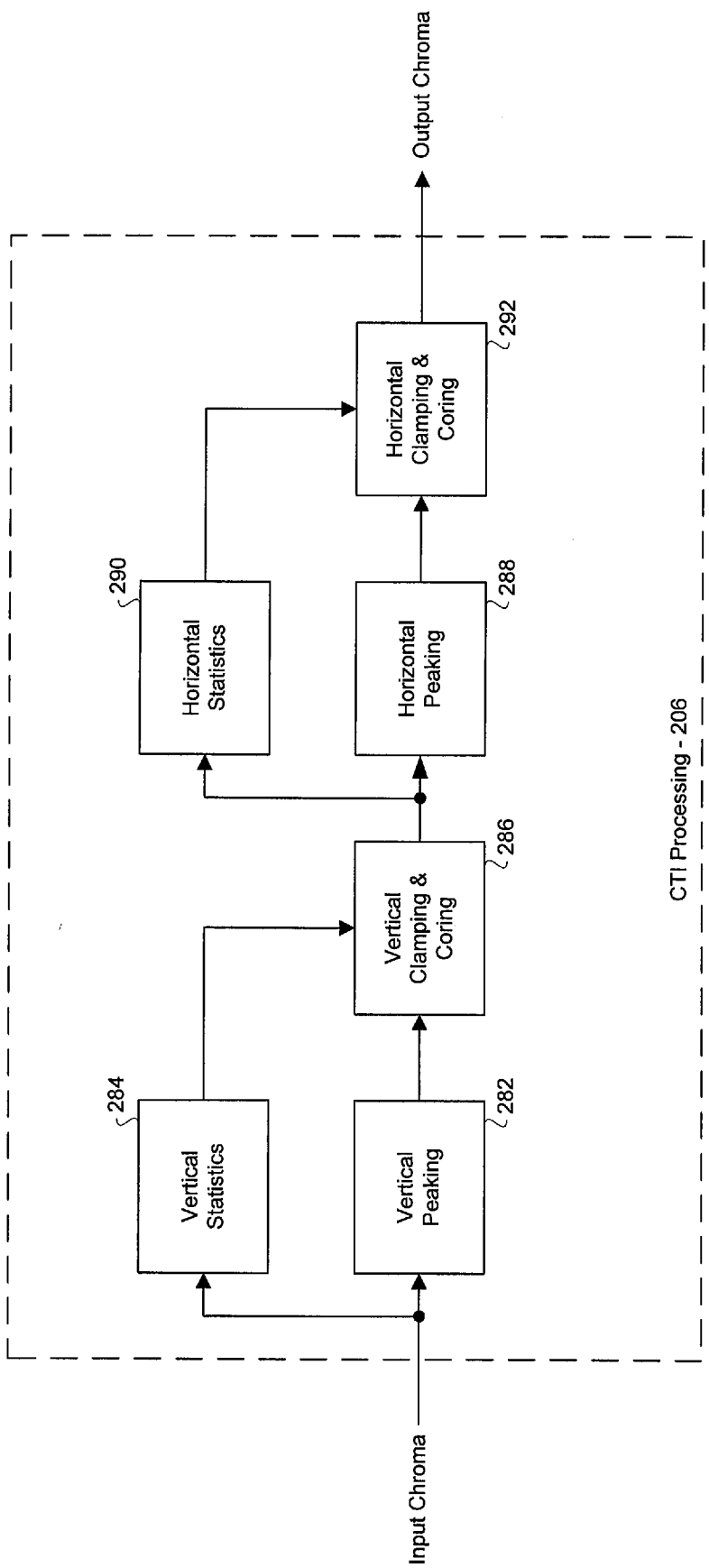
FIG. 2D is a block diagram that illustrates an exemplary CTI processing function that is operable to perform CTI processing during chroma sharpening operations, in accordance with an embodiment of the invention.

FIG. 2D is a block diagram that illustrates an exemplary CTI processing function that is operable to perform CTI processing during chroma sharpening operations, in accordance with an embodiment of the invention. Referring to FIG. 2D, there is shown a vertical peaking function 282, a vertical statistics function 284, a vertical clamping and coring processing function 286, a horizontal peaking function 288, a horizontal statistics function 290, and a horizontal clamping and coring processing function 292.

The vertical peaking function 282 may comprise suitable logic, circuitry, interfaces and/or code that may enable performing CTI based vertical signal peaking processing. The vertical peaking function 282 may comprise filtering logic, which may enable filtering out low frequencies, and/or multiplier logic that enable applying a vertical CTI gain. Filtering parameters, for example coefficients and/or taps, of filters utilized in the vertical peaking function 282 and/or the vertical CTI gain may be predetermined and/or may be predetermined and/or preprogrammed, and/or may be dynamically adjustable.

The vertical statistics function 284 may comprise suitable logic, circuitry and/or code that may be operable to generate sharpening related adjustment data based on chroma information of a plurality of neighboring pixels. The vertical clamping and coring processing function 286 may comprise suitable logic, circuitry and/or code that may enable processing a signal to remove frequency components that are above and/or below a maximum and/or a minimum value, thereby removing, for example, any undershoots, overshoots and/or preshoots. The clamping thresholds may be determined based on predetermined values and/or based on input, for example, from the luma statistics function 210. The vertical clamping and coring processing function 286 may also be operable to process signals based on output signal coring requirements and/or limitations.

The horizontal peaking function 288, the horizontal statistics function 290, and the horizontal clamping and coring processing function 292 may be substantially similar to the vertical peaking function 282, a vertical statistics function 284, a vertical clamping and coring processing function 286. However, operations of the horizontal peaking function 288, the horizontal statistics function 290, and the horizontal clamping and coring processing function 292 may be modified, by adjusting the filtering parameters and/or statistics management, to enable performing horizontal CTI processing.

In operation, the CTI processing function 206 may be operable to perform chroma transient improvement based sharpening processing of chroma signals. The input chroma signal may be inputted vertical peaking function 282 to perform vertical peaking processing operations, which may comprise filtering low frequency components and/or applying CTI gain, which may predetermined and/or dynamically selected, based on user input for example. The input chroma signal may also be provided to the vertical statistics function 284 to enable generation and/or extraction of sharpening adjustment input, based on chroma information of neighboring pixels for example. The peaked signal may then be processed via the vertical clamping and coring processing function 286, to enable performing clamping operations to remove, for example, any overshoots, undershoots and/or preshoots, and/or to perform necessary coring adjustments, which may be further adjusted based on the input from the vertical statistics function 284. The processed signal may be processed via the horizontal peaking function 288, the horizontal statistics function 290, and the horizontal clamping and coring processing function 292 to facilitate horizontal sharpening processing of the input chroma signal.

Figure 3:
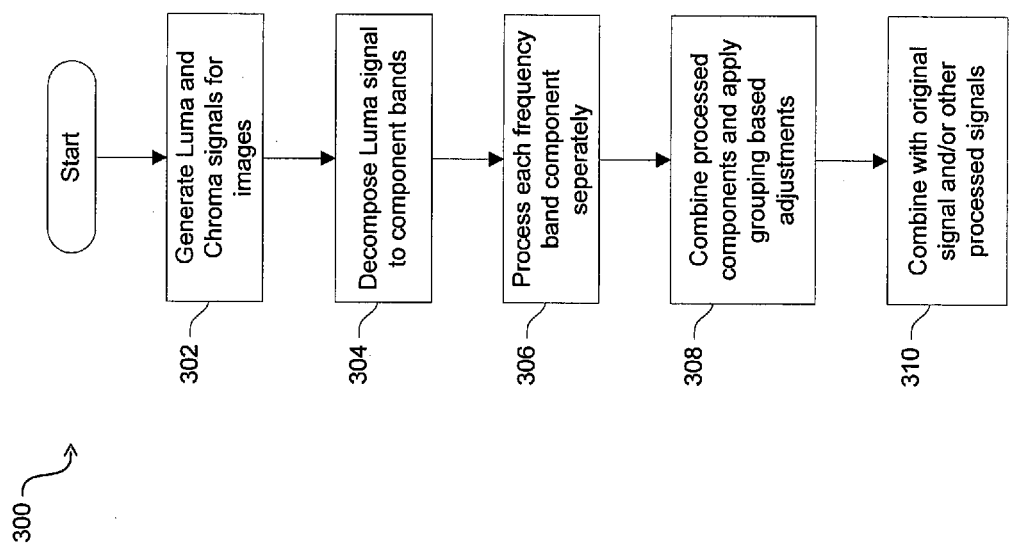
FIG. 3 is a flow chart that illustrates use of multi-band sharpening operations, in accordance with an embodiment of the invention.

FIG. 3 is a flow chart that illustrates use of multi-band sharpening operations, in accordance with an embodiment of the invention. Referring to FIG. 3, there is shown a flow chart 300 comprising a plurality of exemplary steps, which may enable performing multi-band sharpening luma processing.

In step 302, luma and chroma signals may be generated. For example, the video processor 110 may be operable to generate luma and chroma signal based on Y'CbCr data extracted from and/or generated based on received input video stream 104. In step 304, the luma signal may be decomposed into a plurality of frequency band components. For example, peaking processing function 202 may be operable to perform decomposition processing, to generate the plurality of frequency band components 226, via the plurality of vertical filtering functions 222a, . . . , 222c and the horizontal filtering function 224. In step 306, each frequency band component may be processed separately. For example, the processing gain and input coring function 228 may be operable to process each of the plurality of the frequency band components 226 separately, to enable application of different sharpening parameters and/or adjustment to each of the frequency band components. In step 308, the processed components may be combined to generate a finalized multi-band sharpened signal. For example, the cross bar function 230, the plurality of sum processing and output coring function 232a, . . . , 232c, and/or the combiner 234 may be operable to combine the processed components and/or to apply final adjustments based on, for example, beam direction groupings.

In step 310, the multi-band sharpened luma signal may be combined with other processed signals. For example, the original luma and chroma signals may be processed separately, via the LTI processing function 204 and the CTI processing function 206, respectively, during multi-band peaking processing of the input luma signal. The LTI processed luma signal may then be combined with the multi-band peaking processed luma signal and/or the original input luma signal, to generate the output sharpened luma signal. The sharpened output luma and chroma signals may then be utilized to generate the output video stream 106, via the video processor 110, to enable displaying sharpened images via the display subsystem 108 in the video system 100.

Various embodiments of the invention may comprise a method and system for sharpening the luma and the chroma signals. The sharpening module 112, in the video processor 110, may be operable to sharpen luma and/or chroma signals during video processing operations in the video system 100. The sharpening module 112 may be operable to utilizing multi-band peaking sharpening, via the peaking processing function 202, to process luma signals, wherein the frequency band components decomposition may be based on beam direction and/or frequency level. The plurality of frequency band components may comprise vertical, horizontal and/or diagonal, and/or low, medium and/or high frequency components. The peaking processing function 202 may enable decomposing the luma signals into the plurality of frequency band components 226, via the plurality of vertical filtering functions 222a, . . . , 222c and/or the horizontal filtering function 224 for example. Each component may be processed separately, via the gain processing function 228 using different sharpening gains and/or offsets. The peaking processing function 202 may be operable to combine the processed multi-band components, via the cross bar function 230, the plurality of sum processing and output coring function 232a, . . . , 232c, and/or the combiner 234, to generate multi-band sharpened luma signals.

The sharpening module 112 may be operable to combine, via the combiner 208, the multi-band peaking output signal with the original input luma signals and/or with LTI sharpened input luma signals, generated via the LTI processing function 204, to generate sharpened output luma signals. The sharpening module 112 may be operable to adjust corresponding chroma signals for the image signals to generate sharpened output chroma signals, wherein the CTI processing function 206 may be operable to generate CTI sharpened chroma signals. The sharpening module 112 may be operable to control and/or adjust luma and/or chroma sharpening based on luma statistics and/or color region detection, via the luma statistics function 210 and/or the color region detector 212, respectively. The sharpening module 112 may be operable to adjust luma and/or chroma sharpening operations based on input and/or output coring, clipping avoidance, via the clipping avoidance function 236, and/or curve control, via the curve control function 266.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for sharpening the luma and the chroma signals.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   decomposing an input luma signal for an image signal into a plurality of frequency band components using a plurality of vertical filtering functions and at least one horizontal filtering function, each one of the vertical filtering functions being applied in series with one of the at least one horizontal filtering function;

separately adjusting each of said plurality of frequency band components to generate a sharpened output luma signal, wherein separately adjusting comprises applying peaking processing by extracting a high frequency component of said input luma signal, multiplying said extracted component by a first gain to provide a first result, and combining the first result with said input luma signal;

grouping the separately adjusted frequency band components into a plurality of subsets using a cross bar circuit, based at least in part on one or more criteria, for further separate adjustment of each of the subsets to generate the sharpened output luma signal;

adjusting a corresponding input chroma signal for said image signal to generate a sharpened output chroma signal; and generating a sharpened output image signal based at least in part on said sharpened output luma signal and said sharpened output chroma signal.

2. The method according to claim 1, comprising combining said adjusted frequency band components with said input luma signal, processed signals generated via luma transient improvement (LTI) processing, or both said input luma signal and said processed signals generated via LTI processing to generate said sharpened output luma signal, wherein said LTI processing is performed independent from, parallel to, or both independent from and parallel to said luma signal multi-band adjustment processing.

3. The method according to claim 1, comprising grouping said component frequency bands during said luma signal multi-band adjustment processing, wherein said grouping is performed based at least in part on beam direction, frequency level, or both beam direction and frequency level.

4. The method according to claim 1, wherein said adjustment utilizes sharpening gains, offsets, or both gains and offsets.

5. The method according to claim 1, comprising adjusting said input luma, chroma signals based at least in part on luma statistics, wherein said luma statistics comprise luma information corresponding to neighboring pixels.

6. The method according to claim 1, comprising sharpening said input luma signal based at least in part on chroma region detection, wherein said chroma region detection comprises mapping pixels to color regions that comprise specific luma adjustment criteria.

7. The method according to claim 1, comprising adjusting said input luma, chroma, or both luma and chroma signals based at least in part on input, output, or both input and output coring parameters.

8. The method according to claim 1, comprising adjusting peaking based sharpening during processing of said input luma signal based at least in part on clipping avoidance, wherein said clipping avoidance guards against improperly exceeding luma limits.

9. The method according to claim 1, comprising adjusting a start point for applying luma transient improvement sharpening during processing of said input luma signal based at least in part on cut-off frequency input, wherein said cut-off frequency input is dynamically modifiable.

10. The method according to claim 1, comprising adjusting luma transient improvement sharpening during processing of said input luma signal based at least in part on curve control parameters.

11. A system comprising:
one or more circuits that are operable to decompose an input luma signal for an image signal into a plurality of frequency band components using a plurality of vertical filtering functions and at least one horizontal filtering function, each one of the vertical filtering functions being applied in series with one of the at least one horizontal filtering function;

said one or more circuits are operable to separately adjust each of said plurality of frequency band components to generate a sharpened output luma signal,
wherein separately adjusting comprises applying peaking processing by extracting a high frequency component of said input luma signal, multiplying said extracted component by a first gain to provide a first result, and combining the first result with said input luma signal, and
wherein the one or more circuits further include a cross bar circuit configured to group the separately adjusted frequency band components into a plurality of subsets, based at least in part on one or more criteria, for further separate adjustment of each of the subsets to generate the sharpened output luma signal;

said one or more circuits are operable to adjust a corresponding input chroma signal for said image signal to generate a sharpened output chroma signal; and said one or more circuits are operable to generate a sharpened output image signal based at least in part on said sharpened output luma signal and said sharpened output chroma signal.

12. The system according to claim 11, wherein said one or more circuits are operable to combine said adjusted frequency band components with said input luma signal, processed signals generated via luma transient improvement (LTI) processing, or both said input luma signal and said processed signals generated via LTI processing to generate said sharpened output luma signal, wherein said LTI processing is performed independent from, parallel to, or both independent from and parallel to said luma signal multi-band adjustment processing.

13. The system according to claim 11, wherein said one or more circuits are operable to group said component frequency bands during said luma signal multi-band adjustment processing, wherein said grouping is performed based at least in part on beam direction, frequency level, or both beam direction and frequency level.

14. The system according to claim 11, wherein said adjustment utilizes sharpening gains, offsets, or both gains and offsets.

15. The system according to claim 11, wherein said one or more circuits are operable to adjust said input luma, chroma, or both luma and chroma signals based at least in part on luma statistics, wherein said luma statistics comprise luma information corresponding to neighboring pixels.

16. The system according to claim 11, wherein said one or more circuits are operable to sharpen said input luma signal based at least in part on chroma region detection, wherein said chroma region detection comprises mapping pixels to color regions that comprise specific luma adjustment criteria.

17. The system according to claim 11, wherein said one or more circuits are operable to adjust said input luma, chroma, or both luma and chroma signals based at least in part on input, output, or both input and output coring parameters.

18. The system according to claim 11, wherein said one or more circuits are operable to adjust peaking based sharpening during processing of said input luma signal based at least in part on clipping avoidance, wherein said clipping avoidance guards against improperly exceeding luma limits.

19. The system according to claim 11, wherein said one or more circuits are operable to adjust a start point for applying luma transient improvement sharpening during processing of said input luma signal based at least in part on cut-off frequency input, wherein said cut-off frequency input is dynamically modifiable.

20. The system according to claim 11, wherein said one or more circuits are operable to adjust luma transient improvement sharpening during processing of said input luma signal based at least in part on curve control parameters.

21. A system, comprising:
    a sharpening module comprising circuitry configured to:
        decompose an input luma signal for an image signal into a plurality of frequency band components;
        generate a sharpened output luma signal by:
            separately adjusting each of the frequency band components;
            grouping, by a cross bar circuit, the separately adjusted frequency band components into a plurality of subsets based at least in part on at least one criterion;
            separately adjusting each of the subsets; and
            combining the separately adjusted subsets;
        generate a sharpened output chroma signal by adjusting a corresponding input chroma signal for the image signal; and
        generate a sharpened output image signal based at least in part on the sharpened output luma signal and the sharpened output chroma signal.

22. The system of claim 21, wherein the circuitry is further configured to generate the sharpened output luma signal by performing peaking-based sharpening of the input luma signal.

23. The system of claim 21, wherein the circuitry is further configured to generate the sharpened output luma signal by combining the separately adjusted subsets with processed signals generated in parallel via luma transient improvement processing.

24. The system of claim 21, wherein the circuitry is further configured to decompose the input luma signal by performing a plurality of vertical filtering functions and at least one horizontal filtering function, each one of the vertical filtering functions being applied in series with one of the at least one horizontal filtering function.

25. The system of claim 21, wherein the circuitry is further configured to generate said sharpened output luma signal by sharpening said input luma signal based at least in part on chroma region detection, wherein the chroma region detection comprises mapping pixels to color regions that comprise specific luma adjustment criteria.

* * * * *